United States Patent
Bower, III

(10) Patent No.: US 7,340,740 B2
(45) Date of Patent: Mar. 4, 2008

(54) COOPERATIVELY MULTITASKING IN AN INTERRUPT FREE COMPUTING ENVIRONMENT

(75) Inventor: Fred A. Bower, III, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 815 days.

(21) Appl. No.: 10/421,978

(22) Filed: Apr. 22, 2003

(65) Prior Publication Data

US 2004/0216100 A1    Oct. 28, 2004

(51) Int. Cl.
*G06F 9/44* (2006.01)
*G06F 9/46* (2006.01)

(52) U.S. Cl. .................. 718/100; 718/107; 719/318

(58) Field of Classification Search .............. 718/105, 718/107, 100, 104; 719/310, 318; 710/5, 710/48, 51, 260–264
See application file for complete search history.

(56) References Cited

U.S. PATENT DOCUMENTS

| | | | |
|---|---|---|---|
| 4,663,709 A * | 5/1987 | Fujiwara et al. ............ 710/267 |
| 5,187,802 A * | 2/1993 | Inoue et al. ................ 718/107 |
| 5,218,712 A * | 6/1993 | Cutler et al. ............... 710/261 |
| 5,257,372 A * | 10/1993 | Furtney et al. ............. 718/105 |
| 5,367,680 A * | 11/1994 | Flurry et al. ............... 718/107 |
| 5,504,881 A | 4/1996 | Sirurget ................. 395/183.14 |
| 5,530,891 A * | 6/1996 | Gephardt ....................... 710/8 |
| 5,555,368 A | 9/1996 | Orton et al. ............... 395/157 |
| 5,555,430 A * | 9/1996 | Gephardt et al. ............ 712/16 |
| 5,560,018 A | 9/1996 | Macon, Jr. et al. ......... 395/733 |
| 5,564,060 A * | 10/1996 | Mahalingaiah et al. ....... 710/51 |
| 5,566,349 A | 10/1996 | Trout ......................... 395/840 |
| 5,613,126 A * | 3/1997 | Schmidt ..................... 710/260 |
| 5,721,931 A * | 2/1998 | Gephardt et al. ........... 710/260 |
| 5,778,236 A * | 7/1998 | Gephardt et al. ........... 710/266 |
| 5,781,187 A * | 7/1998 | Gephardt et al. ........... 710/309 |
| 5,911,065 A | 6/1999 | Williams et al. ............ 396/677 |
| 5,911,077 A * | 6/1999 | Anderson ................... 710/268 |
| 5,911,078 A * | 6/1999 | Anderson ................... 710/268 |
| 5,938,708 A | 8/1999 | Wallace et al. ............... 701/48 |
| 6,085,218 A * | 7/2000 | Carmon ...................... 718/107 |
| 6,098,090 A * | 8/2000 | Burns ......................... 718/107 |

(Continued)

FOREIGN PATENT DOCUMENTS

CN    1210306 A    3/1999

(Continued)

OTHER PUBLICATIONS

Liu et al. "Timed Multitasking for Real-Time Embedded Software" 2003 IEEE, pp. 65-75.*

(Continued)

*Primary Examiner*—Van H. Nguyen
(74) *Attorney, Agent, or Firm*—Abdy Raissinia, Esq.; Kevin P. Radigan, Esq.; Heslin Rothenberg Farley & Mesiti, P.C.

(57) ABSTRACT

Multitasking in a hardware interrupt free environment. Event indicators are employed to multitask between processes of the environment. Processes to be multitasked register with one another, and then during processing, one of the processes toggles an event indicator to allow another process to execute. The toggling allows the processes to share resources in an interrupt free environment.

9 Claims, 3 Drawing Sheets

U.S. PATENT DOCUMENTS

| | | | |
|---|---|---|---|
| 6,098,142 A * | 8/2000 | Leggett et al. | 710/220 |
| 6,256,659 B1 | 7/2001 | McLain, Jr. et al. | 709/100 |
| 6,314,471 B1 * | 11/2001 | Alverson et al. | 710/5 |
| 7,178,062 B1 * | 2/2007 | Dice | 714/38 |
| 2003/0005026 A1 | 1/2003 | Bower, III | 709/103 |

FOREIGN PATENT DOCUMENTS

| | | |
|---|---|---|
| EP | 0905618 | 8/2003 |
| JP | 2000029941 | 1/2000 |

OTHER PUBLICATIONS

Frailong et al. "The Next-Generation SPARC Multiprocessing System Architecture" 1993 IEEE, pp. 475-480.*

Heidelberger et al. "Analytic Queuing Models for Programs with Internal Concurrency" 1983 IEEE, pp. 73-82.*

"Method of Launching Low-Priority Tasks", U.S. Appl. No. 09/898,978, filed Jul. 2, 2001.

"Software Process Validation: Quantitatively Measuring the Correspondence of a Process to a Model", Jonathan E. Cook, Alexander L. Wolf, ACM Transactions on Software Engineering and Methodology, vol. 8, No. 2, Apr. 1999, pp. 147-176.

"Assessing Process-Centered Software Engineering Environments", Vincenzo Ambriola, Reidar Conradi, Alfonso Fuggetta, ACM Transactions on Software Engineering and Methodology, vol. 6, No. 3, Jul. 1997, pp. 283-328.

"MERT—A Multi-Environment Real-Time Operating System", D.L. Bayer, H. Lycklama, Bell Laboratories, Murray Hill, New Jersey, pp. 33-42.

"Cooperative Spoken Dialogue Model Using Bayesian Network and Event Hierarchy", Mashahiro Araki and Shuji Doshita, IEICE Transactions on Information and System, vol. E78-D, No. 6, Jun. 1995, pp. 629-635.

"Assessing Process-Centered Software Engineering Environments", Vincenzo Ambriola, Reidar Conradi, Alfonso Fuggetta, ACM Transactions on Software Engineering and Methodology, vol. 6, No. 3, Jul. 1997, pp. 283-328.

"MERT—A Multi-Environment Real-Time Operating System", D.L. Bayer, H. Lycklama, Bell Laboratories, Murray Hill, New Jersey, 1975, pp. 33-42.

"MERT—A Multi-Environment Real-Time Operating System", D.L. Bayer, H. Lycklama, Bell Laboratories, Murray Hill, New Jersey, pp. 33-42, No data found.

* cited by examiner

COOPERATIVELY MULTITASKING IN AN INTERRUPT FREE COMPUTING ENVIRONMENT

BACKGROUND OF THE INVENTION

1. Field of the Invention

This invention relates, in general, to multitasking within a computing environment, and in particular, to multitasking in a hardware interrupt free computing environment.

2. Description of Related Art

At times, it is desirable to operate within a computing environment with limited functionality enabled. This reduces complexity and facilitates debugging. However, in order to provide limited functionality, certain features are disabled or not provided. One such feature is system or hardware interrupts. The disabling of system interrupts reduces the complexity of the environment, but at a cost. The cost is that certain functions are not provided, such as, for instance, multitasking.

Multitasking enables an individual process to share resources (e.g., CPU, memory, etc.) with one or more other individual processes without requiring the process to completely exit before allowing another process to execute. Instead, the multitasking processes remain resident in memory.

With the disabling of system interrupts, however, multitasking is not performed. Instead, a process runs for a period of time, saves its state in persistent storage, and then exits completely, before another process that is to share the resource commences execution. This increases complexity and degrades system performance. Thus, a need exists for a capability that enables multitasking in the absence of hardware interrupts.

BRIEF SUMMARY OF THE INVENTION

The shortcomings of the prior art are overcome and additional advantages are provided through the provision of a method of multitasking in a computing environment. The method includes, for instance, executing a first process in a hardware interrupt free computing environment; and multitasking the first process with a second process of the hardware interrupt free computing environment, wherein the multitasking includes employing one or more event indicators.

In one example, the employing includes toggling at least one event indicator of the one or more event indicators to indicate which process of the first process and the second process is to execute.

In another embodiment, a method of multitasking in a single processor environment is provided. The method includes, for instance, executing a first process in a hardware interrupt free single processor environment; and multitasking the first process with a second process of the hardware interrupt free single processor environment.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Overview

In accordance with an aspect of the present invention, a multitasking capability is provided that enables processes to cooperatively multitask in a hardware interrupt free computing environment. The processes employ event indicators to perform the multitasking, as one example. The toggling of the event indicators indicates that a process is to sleep, while another is to execute.

Detailed Description

Figure 1A:
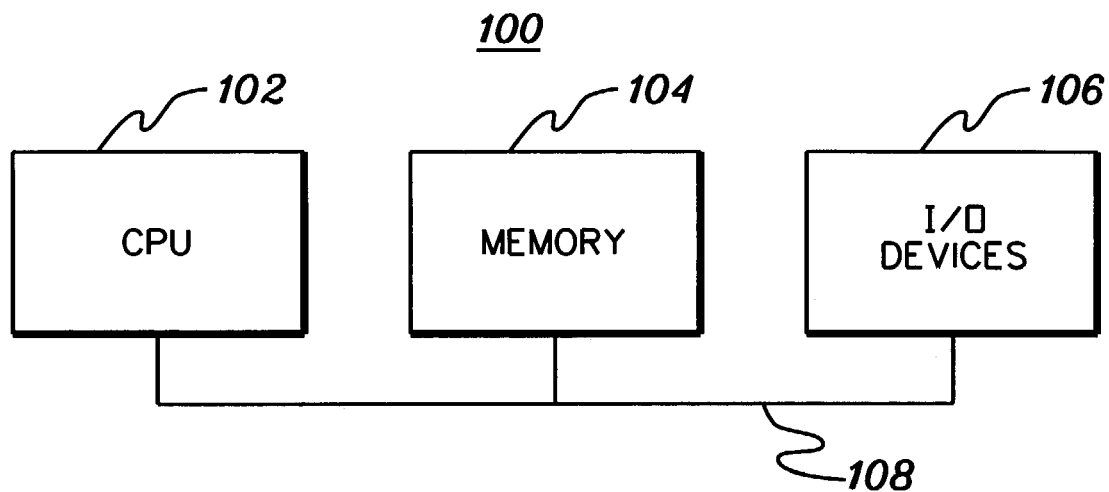
FIG. 1a depicts one embodiment of a computing environment to incorporate and use one or more aspects of the present invention.

One embodiment of a computing environment to incorporate and use one or more aspects of the present invention is described with reference to FIG. 1a. A computing environment 100 includes, for instance, a central processing unit 102, a memory 104 (e.g., main memory) and one or more input/output (I/O) devices 106 coupled to one another via, for example, one or more buses 108.

As one example, computing environment 100 includes an Itanium processor (i.e., a single threaded single processor) executing the Extensible Firmware Interface (EFI), available from Intel Corporation, Santa Clara, Calif. EFI is a firmware operating environment that supports utility applications, such as diagnostics or operating system loaders. EFI is built to particular specifications. EFI allows a machine to operate without an extensive amount of configuration or functionality by instituting certain rules. As an example, processes are limited to particular priority levels. That is, a given process may temporarily increase its priority level of operation, if it is operating at a low or medium priority level, but is not allowed to decrease its priority level of operation, according to the specifications. Further, a higher priority process is not allowed to launch lower priority processes.

Although EFI has instituted these rules to reduce complexity, there are times when greater functionality is beneficial, even within the EFI environment. Thus, steps have been taken to overcome some of the limitations of EFI. For example, a capability is now provided in which a higher priority task is able to launch lower priority tasks. This is described in U.S. patent application Ser. No. 09/898,978, entitled "Method of Launching Low-Priority Tasks", filed Jul. 2, 2001, and published on Jan. 2, 2003 as U.S. Patent Publication No. US 2003/0005026 A1, which is hereby incorporated herein by reference in its entirety.

As a further example, within an EFI environment, system or hardware interrupts are disabled in order to reduce complexity within the environment. The disabling of the interrupts, however, effects the providing of certain functions that may be beneficial. This includes, for instance, multitasking, in which separate and distinct processes share resources (e.g., hardware resources, such as CPU, memory, etc.) of the computing environment to execute. Thus, in accordance with an aspect of the present invention, a capability is provided that enables multitasking to be performed in a hardware interrupt free environment.

Figure 1B:
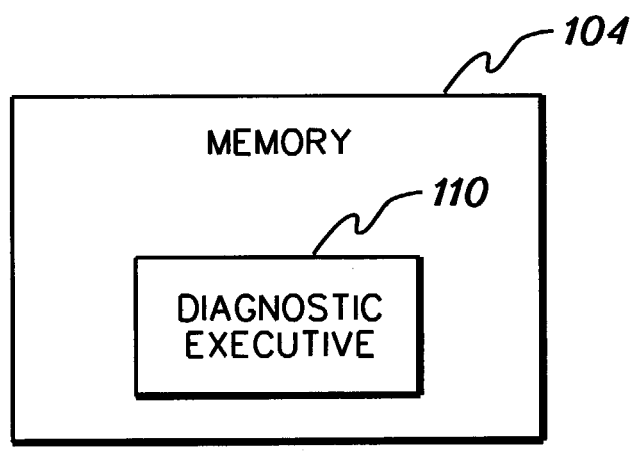
FIG. 1b depicts one example of a diagnostic executive residing in memory of the computing environment of FIG. 1a, in accordance with an aspect of the present invention.

One embodiment of the logic associated with an initialization procedure to enable multitasking in a hardware interrupt free environment is described with reference to FIG. 2. Initially, an executive process is initialized, STEP 200. The executive process is typically, but not necessarily, a process that runs at a higher priority than other processes. It may be, for instance, a diagnostic executive 110 (FIG. 1b) that is responsible for launching, monitoring and interpreting results from diagnostic tests. The diagnostic executive resides in memory and runs at a privileged level that allows it to have at least some control over the diagnostic tests. The initialization includes, for instance, initializing a memory location for an event indicator (e.g., a flag), which is of a predefined size (e.g., one or more bits).

Figure 2:
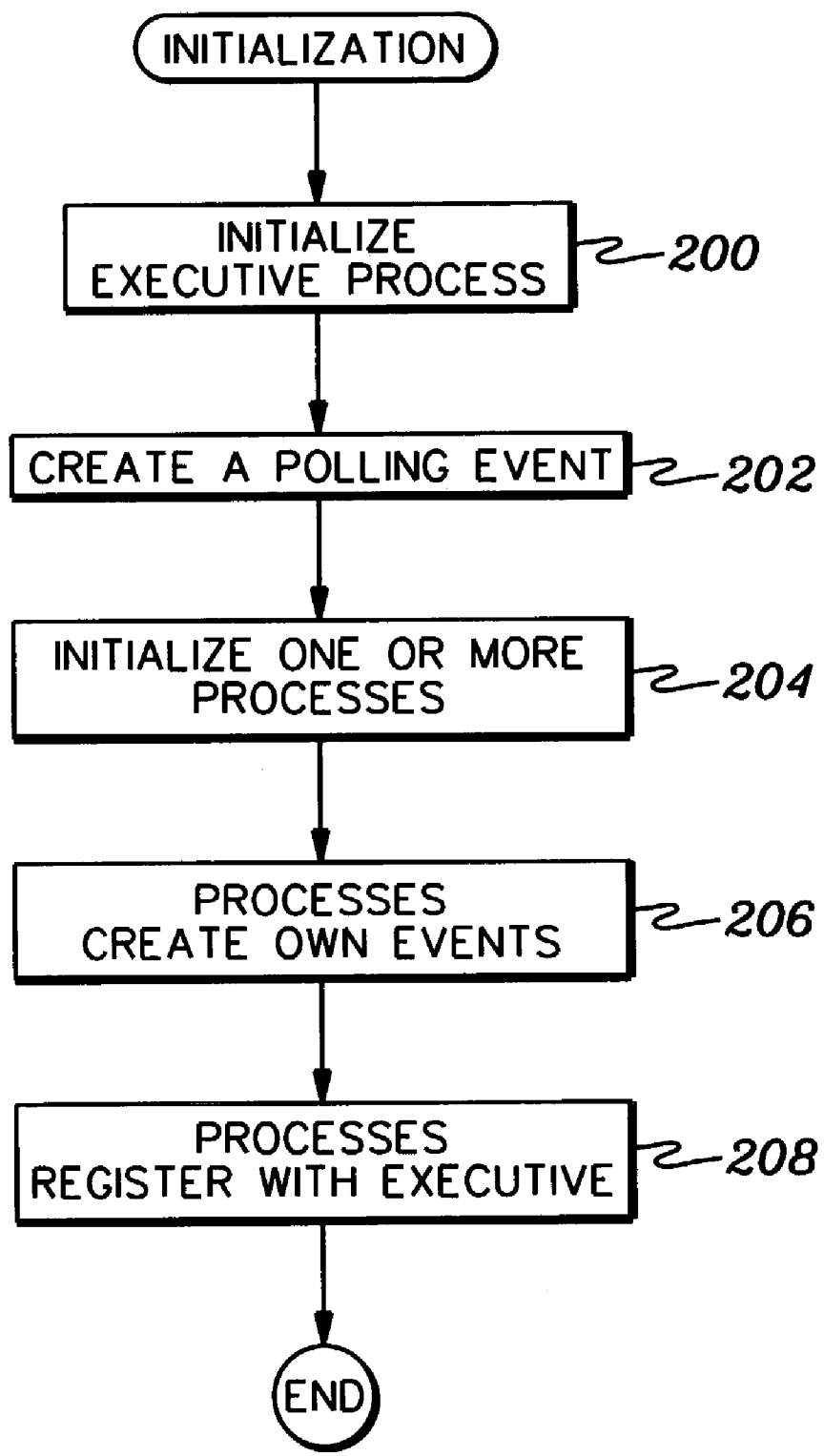
FIG. 2 depicts one example of the logic associated with an initialization technique relating to the multitasking capability of an aspect of the present invention.

In addition to initializing the executive process, a polling event (e.g., in EFI, an EVT_Notify_signal event) is created, STEP 202 (FIG. 2). This polling event indicates, for example, that when a process goes to sleep on the event, a corresponding event indicator is reset (e.g., cleared), and one or more other processes are allowed to execute. As is known, the polling event is a software construct that supports the waiting upon the toggling of the flag. In some environments, such as EFI, one or more application programming interfaces (APIs) are provided to create the polling event.

Moreover, one or more other processes are initialized, STEP 204. In the diagnostic example, these processes may be tests. However, the processes need not be diagnostic tests; other types of processes may be initialized. Similar to the executive, each of these processes creates an event indicator and places it in a selected memory location. Likewise, each process creates its own event, which is similar to the executive's event, STEP 206.

The processes then register with the executive, STEP 208. This includes, for instance, a registration handshake, in which the memory locations of event indicators for the processes are exchanged. For example, a process provides to the executive an indication of where its indicator is located, and, in turn, the executive provides to the process a location of its indicator. Thus, in this example, the executive and other processes are cooperative, in that they, at least implicitly, work together to enable multitasking. The registration process completes the initialization technique, and allows multitasking to commence.

Figure 3:
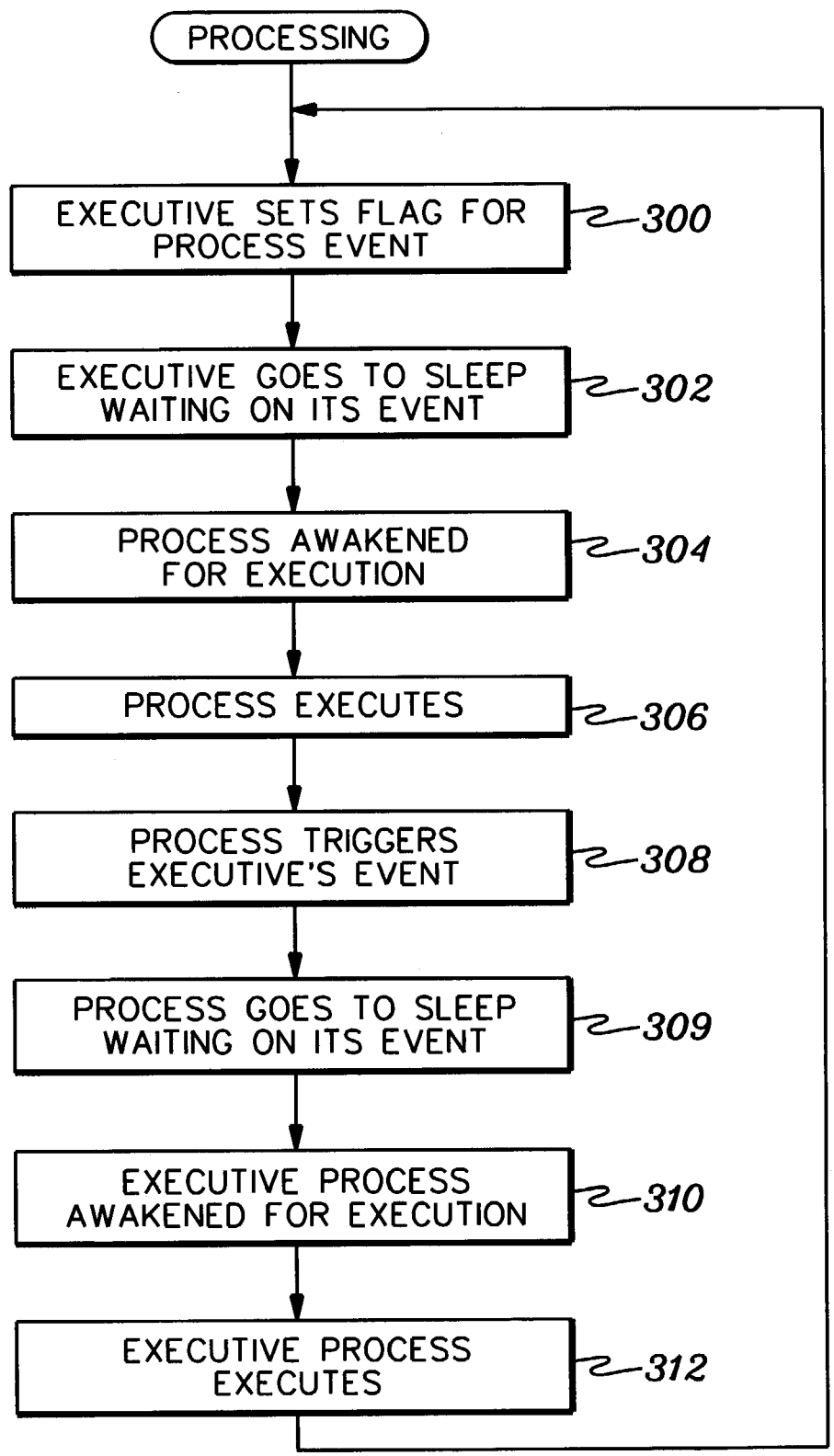
FIG. 3 depicts one example of the logic associated with the multitasking capability of an aspect of the present invention.

One embodiment of the logic associated with multitasking in a hardware interrupt free environment is described with reference to FIG. 3. Initially, the executive sets the flag corresponding to a cooperative process' event indicating that the cooperative process can run, STEP 300. The executive's flag is in the cleared state and the executive goes to sleep waiting on its event, STEP 302. A scheduling process, such as the EFI scheduling process, determines that the cooperative process' event has been triggered, and it awakens the cooperative process for execution, STEP 304. In one example, the EFI scheduler places the process in a ready-to-execute queue.

The process executes, STEP 306, and at a desired time (e.g., at end of execution or other selected time), the process triggers the executive's event, STEP 308. For example, the process sets the executive flag. Further, the process goes to sleep waiting on its event flag, STEP 309, and its event flag is reset.

The scheduling process then determines that the executive process' event has been triggered, and awakens the executive process for execution, STEP 310. The executive process executes for an amount of time (e.g., until a particular task is completed or some other selected time), STEP 312, and processing continues at STEP 300.

Described in detail above is a multitasking capability that enables processes to be multitasked in a hardware interrupt free environment. In one example, the environment is a single processor environment. Any number of processes can be supported.

Advantages

Advantageously, multitasking is enabled in a hardware interrupt free environment. Multitasking allows processes to share resources (e.g., hardware resources, such as CPU, memory, etc.) without having to terminate execution. Instead, each process remains active in memory in order to preserve the process' state. The processes simply go to sleep to enable one or more other processes to execute, and then, in turn, are awakened. The sharing of the resources is transparent in that a user is not aware that multiple processes are operating in the same physical hardware.

The multitasking capability advantageously allows multiple processes to run simultaneously, passing active execution back and forth to one another through a set of events, which are controlled by flags.

This multitasking capability is beneficial for many functions, including diagnostic testing. Advantageously, the diagnostic executive executes for a certain amount of time, and then allows one or more other testing processes to run. In accordance with an aspect of the present invention, the diagnostic executive is a mid-priority dispatcher of one priority (e.g., either medium or high priority) that enables a lower priority process to be spawned, when the process' event is triggered. The lower priority process executes for a period of time and then allows the executive to run, again.

Thus, in accordance with one or more aspects of the present invention, multitasking is provided in environments that do not allow and/or do not use hardware interrupts. Additionally, a programmer is able to span privilege domains in directions not allowed for within EFI and similar environments.

ALTERNATE EMBODIMENTS

Although an example of a computing environment is described above, this is only an example. A computing environment having different components may incorporate and/or use one or more aspects of the present invention. For instance, a processor may be other than an Itanium processor, and/or other than an Intel processor. Further, the computing environment need not include the EFI environment. Other variations are also possible and are considered a part of the claimed invention. Moreover, other computing and/or operating environments may incorporate and use one or more aspects of the present invention, without departing from the spirit of the present invention.

Further, in another embodiment, the executive process may be other than a diagnostic executive. In yet another example, there need not be an executive process, just processes that are to be multitasked. Further, the processes need not be diagnostic tests. Moreover, although in this example, one process is actively running at a time, in other examples, more than one process can be actively running.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of multitasking processes comprising:
    employing a single threaded computer processor to multitask multiple processes, the single threaded computer processor being a hardware interrupt free computer processor, wherein the employing comprises:
        initiating executing of a first process using the single threaded computer processor;
        multitasking the first process with a second process using the single threaded computer processor, wherein the multitasking comprises setting and employing one or more event indicators created by at least one of the first or second processes; and
    wherein before completion of execution of the first process, the first process is saved in memory of the single threaded computer processor to allow for execution of the second process, wherein the first process remains active in memory to preserve the first process' state, and wherein the employing one or more event indicators comprises toggling at least one event indicator of the one or more event indicators to indicate which process of the first process and the second process is to execute.

2. The method of claim 1, further comprising:
    creating a first event indicator of the one or more event indicators by the first process;
    creating a second event indicator of the one or more event indicators by the second process; and
    toggling between the first event indicator and the second event indicator to multitask the first process and the second process.

3. The method of claim 2, wherein a setting of the first event indicator allows the first process to execute.

4. The method of claim 2, wherein a setting of the second event indicator allows the second process to execute.

5. The method of claim 1, further comprising dynamically registering the second process with the first process at initialization of the second process.

6. The method of claim 5, wherein the registering comprises:
    providing to the first process an indication of a location of an event indicator created by the second process; and
    providing to the second process an indication of a location of an event indicator created by the first process.

7. The method of claim 1, wherein at least one of the first process and the second process is an executive process.

8. The method of claim 7, wherein the other process of the first process and the second process is a spawned process, the spawning of which is facilitated by the executive process, in response to an event indicator of the one or more event indicators, and wherein the executive process has a higher priority than the spawned process.

9. The method of claim 1, wherein the first process and the second process are cooperative processes.

* * * * *